United States Patent [19]

Garaschenko et al.

[11] Patent Number: 5,076,914
[45] Date of Patent: Dec. 31, 1991

[54] APPARATUS FOR SEPARATING FERROMAGNETIC MATERIALS FROM FLUID MEDIA

[76] Inventors: Vyacheslav I. Garaschenko, ulitsa Novorossiiskaya, 1, kv. 42; Alexandr V. Sandulyak, ulitsa Leninskaya, 96, kv. 2; Oleg J. Korkhov, ulitsa Kotlyarevskoyo, 18, kv. 23, all of Rovno, U.S.S.R.

[21] Appl. No.: 415,281
[22] PCT Filed: Dec. 24, 1987
[86] PCT No.: PCT/SU87/00154
§ 371 Date: Aug. 22, 1989
§ 102(e) Date: Aug. 22, 1989
[87] PCT Pub. No.: WO89/05686
PCT Pub. Date: Jun. 29, 1989
[51] Int. Cl.[5] .............. B01D 35/06; B01D 29/62; B01D 35/18
[52] U.S. Cl. .............. 210/186; 55/100; 209/217; 209/223.1; 209/232; 210/222; 210/333.01; 210/340
[58] Field of Search .............. 210/137, 184, 186, 222, 210/223, 695, 333.01, 334, 340; 55/100, 284; 209/217, 223.1, 232

[56] References Cited

U.S. PATENT DOCUMENTS

| | | | |
|---|---|---|---|
| 3,869,390 | 3/1975 | Heitmann et al. | 210/222 |
| 4,054,513 | 10/1977 | Windle | 210/222 |
| 4,110,222 | 8/1978 | Watson | 210/222 |
| 4,244,822 | 1/1981 | Slavens | 210/222 |
| 4,444,659 | 4/1984 | Beelitz et al. | 210/222 |
| 4,602,997 | 7/1986 | Sandulyak et al. | 210/222 |

FOREIGN PATENT DOCUMENTS

| | | | |
|---|---|---|---|
| 314738 | 12/1969 | U.S.S.R. | 210/222 |
| 621306 | 7/1978 | U.S.S.R. | |
| 1057074 | 11/1983 | U.S.S.R. | |
| 1263345 | 10/1986 | U.S.S.R. | 209/224 |

Primary Examiner—W. Gary Jones
Attorney, Agent, or Firm—Lilling and Lilling

[57] ABSTRACT

An apparatus for separating ferromagnetic materials from fluid media has a working passage divided by a partition into sections filled with an insert of ferromagnetic material. A magnetizing system is arranged coaxially with the working passage. An arrangement for imparting reciprocations to the magnetizing system is fashioned as at least two electromagnetic coils with one such coil at the opposite ends of the passage, parameters of the coils being such as to ensure movement of the magnetizing system between two extreme positions.

7 Claims, 4 Drawing Sheets

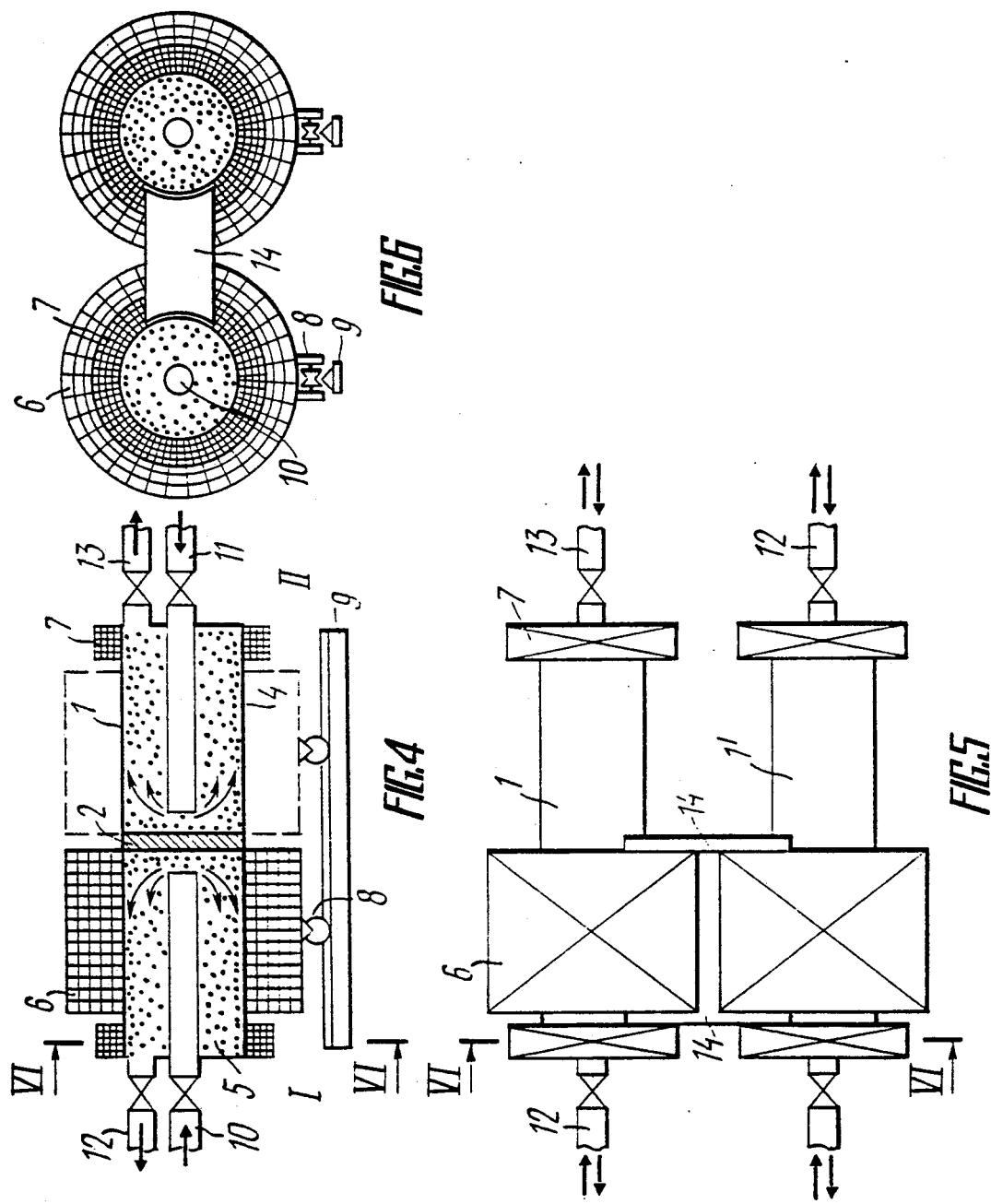

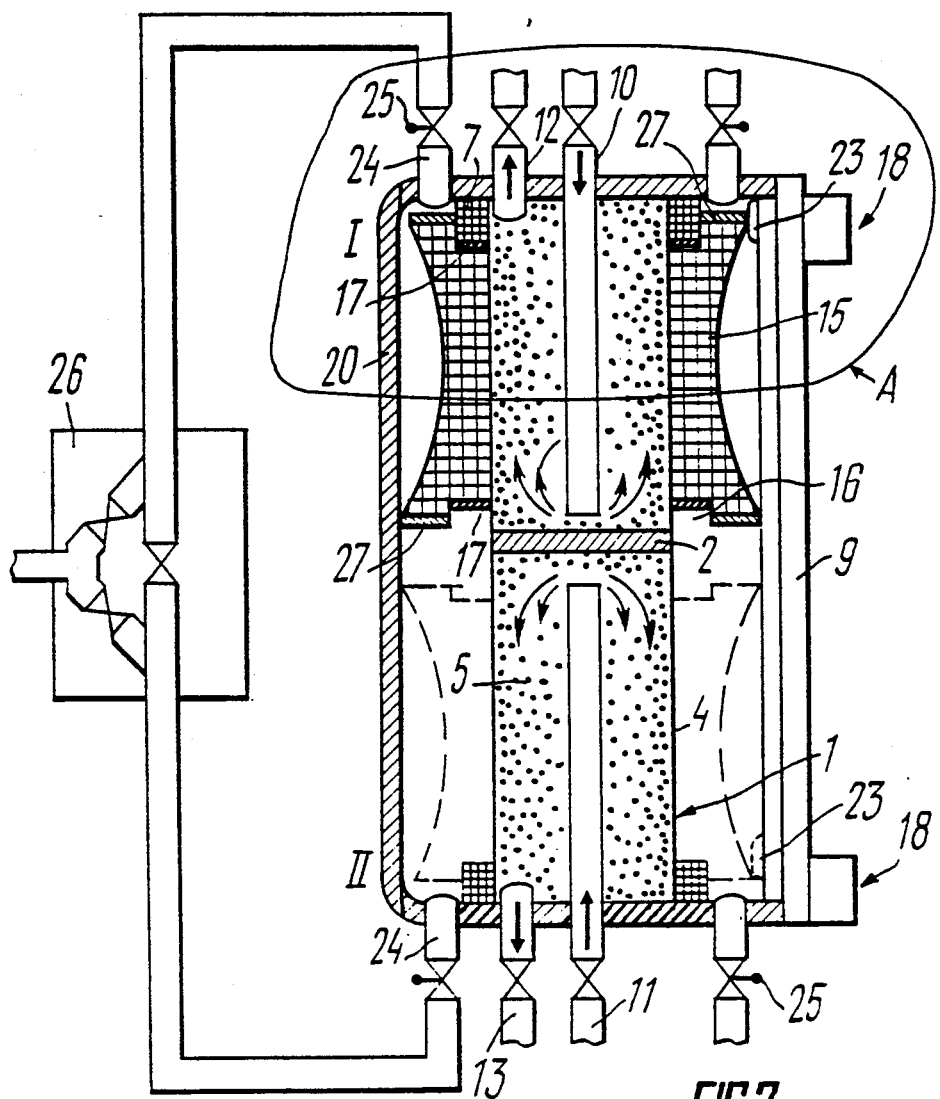
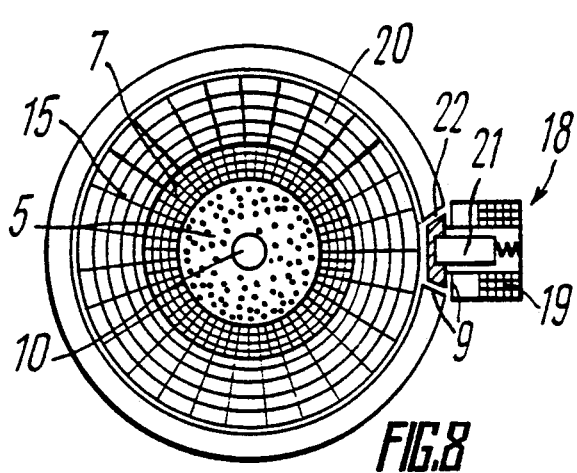
FIG.7
FIG.8

APPARATUS FOR SEPARATING FERROMAGNETIC MATERIALS FROM FLUID MEDIA

BACKGROUND OF THE INVENTION

1. Field of the Invention

This invention relates generally to apparatus for magnetic separation of substances, and more particularly concerns an apparatus for separating ferromagnetic materials from fluid media.

2. Description of the Related Art

There is known an apparatus for separating ferromagnetic materials from fluid media comprising one stationary working passage filled with an insert of ferromagnetic material and having an inlet pipe for feeding a fluid medium to be cleaned and an outlet pipe for discharging the clean fluid medium, and a magnetizing system in the form of a solenoid arranged outside the passage coaxially therewith to magnetize the ferromagnetic insert (DE,C, 1,277,488).

This apparatus is inherently disadvantageous due to that it fails to provide a continuous process of fine magnetic cleaning. During regeneration of the ferromagnetic filtering insert the fluid medium is temporarily conveyed along a by-pass pipe without cleaning. When cleaning highly contaminated media, such as circulating water in metallurgy, the operation period between regenerations amounts to only several hours. In such a case the overall efficiency of the cleaning process is determined by including the time required for regeneration, when the fluid medium is conveyed along the by-pass pipe.

There is also known an apparatus for separating ferromagnetic materials from fluid media comprising at least one stationary working passage divided by a hermetic partition into two successive sections each filled with an insert of ferromagnetic material and having an inlet pipe for feeding a fluid medium to be cleaned to the section and an outlet pipe for discharging the clean fluid medium, and a magnetizing system disposed outside the passage to magnetize the ferromagnetic insert of one such section and provided with a means for imparting thereto a reciprocating movement along the passage between two extreme positions, viz., at the first section and at the second section (cf., U.S. Pat. No. 4,602,997).

In this prior art apparatus the means for imparting reciprocating movement is fashioned as an intricate electromechanical construction including an electric motor, a reducing gear, a worm-and-worm gear, and rods for attaching the magnetizing system to the worm gear. Apart from these principle elements, the reciprocating means includes a system for lubricating the reducing and worm gear pairs, and a large-size base for accommodating parts and elements. Provision of auxiliary elements still further complicates the apparatus structurally. In addition, the reciprocating means includes electromagnets energizable for producing a magnetic cushion when stopping the magnetizing system.

The up and down travel of the magnetizing system effected by the electric motor and worm-and-worm gear is a relatively slow procedure taking a time space of several minutes. During such a procedure the electric drive consumes electric power, and the contaminated fluid medium is either drained or returned to the process flow line thereby reducing the overall efficiency of the process and making the process of cleaning more expensive.

SUMMARY OF THE INVENTION

This invention is therefore directed toward the provision of an apparatus for separating ferromagnetic materials from fluid media of such a construction, which would include a means for imparting reciprocations to the magnetizing system without mechanical linkage for transmitting a power pulse to enable the movement of the magnetizing system from one section to another within several seconds thereby ensuring a continuous cleaning process.

The essence of the invention resides in an apparatus for separating ferromagnetic materials from fluid media comprising at least one stationary working passage divided by a hermetic partition into two successive sections each filled with an insert of ferromagnetic material, having an inlet pipe for feeding to the section a fluid medium to be cleaned and an outlet pipe for discharging the clean fluid medium, and a magnetizing system arranged outside the passage for magnetizing the ferromagnetic insert of one such section and provided with a means for imparting reciprocations thereto along the passage between two extreme positions, each such means for imparting reciprocations having the form of at least two electromagnetic coils arranged each at the opposite ends of the passage, parameters of the coils being such as to ensure movement of the magnetizing system between the extreme positions.

When using a solenoid arranged concentrically with the working passage as the magnetizing system, it is preferable that each end of the solenoid be provided with a recess conforming in shape to the shape of the corresponding electromagnetic coil.

Preferably, the bottom of the recess accommodates a resilient spacer.

Advisably, the proposed apparatus is provided with a means for locking the magnetizing system in its extreme positions fashioned each as an electromagnet secured at one end of the passage so that its core moves perpendicularly to the axis of the passage, whereas the side surface of the solenoid has sockets equal in number to the number of the electromagnets and adapted to engage with the corresponding core.

Alternatively, the solenoid has a non-uniform winding with the number of coil turns growing from the central portion to the ends.

Preferably, the number of coil turns at the ends exceeds the number of coil turns in the central portion by 20–40%.

When the apparatus according to the invention is provided with a means for cooling the magnetizing system having pipes for feeding and discharging a coolant, such pipes are preferably arranged at the opposite ends of the working passage so that their axes run parallel with the axis of the passage, each such pipe being provided with a flow governor and a means for reversing the feed of the coolant.

The apparatus for separating ferromagnetic materials from fluid media according to the invention is characterized by structural simplicity, high reliability and ease of technical servicing.

The proposed apparatus substantially reduces the time of movement of the magnetizing system from one working section to the other, and provides a virtually continuous cleaning cycle, which is especially advantageous when cleaning highly contaminated liquid and gaseous media or circulation water in metallurgy, where transfer from one section to the other must be done every 1-2 h due to high content of impurities.

BRIEF DESCRIPTION OF THE DRAWINGS

The invention will now be described in greater detail with reference to various specific embodiments thereof taken in conjunction with the accompanying drawings, in which:

FIG. 4 is a longitudinal sectional view of an apparatus for separating ferromagnetic materials from fluid media comprising two working passages taken along the axis of one such passage;

FIG. 5 is a top plan view of the apparatus shown in FIG. 4 without guides;

FIG. 6 is a section taken along the line VI—VI in FIG. 5;

FIG. 7 is a general longitudinal sectional view of an apparatus for separating ferromagnetic materials provided with means for locking the position of the magnetizing system and means for cooling the magnetizing system;

FIG. 8 is a section taken along the line VII—VII in FIG. 7; and

DESCRIPTION OF THE PREFERRED EMBODIMENT

Figure 1:
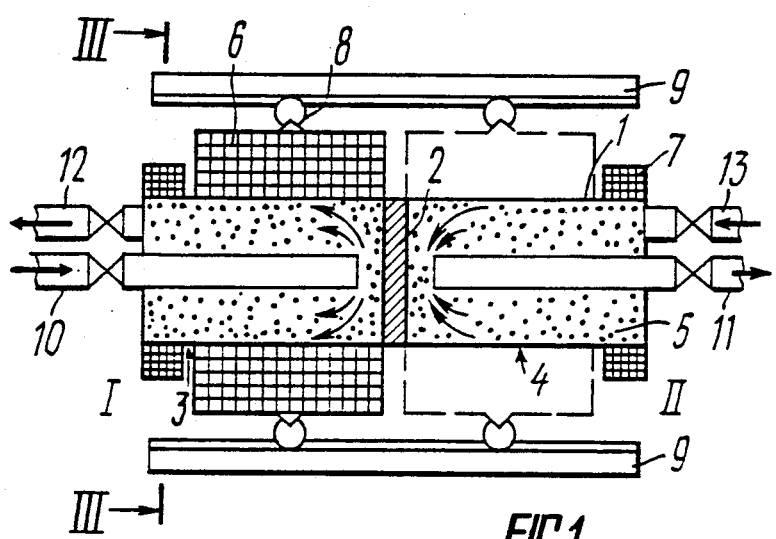
FIG. 1 is a longitudinal sectional view of an apparatus for separating ferromagnetic materials from fluid media comprising one working passage.
Figure 3:
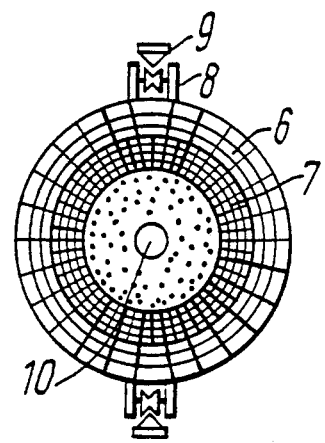
FIG. 3 is a section taken along the line III—III in FIG. 1.
Figure 2:
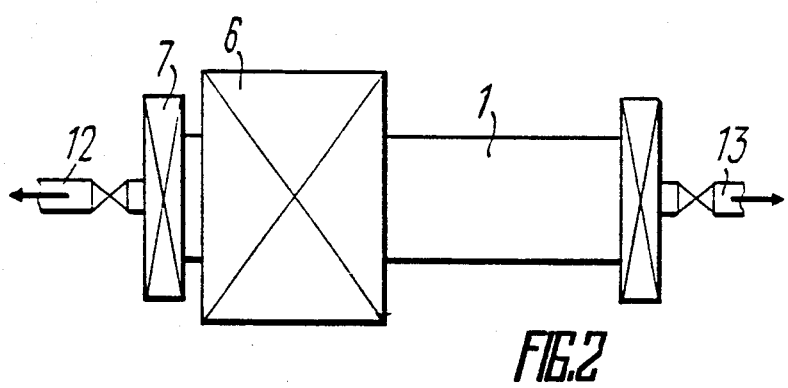
FIG. 2 is a top plan view of the apparatus shown in FIG. 1 without guides.

An apparatus for separating ferromagnetic materials from fluid media shown in FIGS. 1,2 and 3 comprises at least one working passage 1 divided by a hermetic partition 2 into two successively arranged sections 3 and 4 each filled with an insert 5 of ferromagnetic material.

Used as the insert 5 is such ferromagnetic material as shot, chip, plates, ferrite rods, or ferroelectric. In the case of using the apparatus for fine cleaning fluid media, including cleaning liquid and gaseous media, the insert 5 must have a sufficient resistance against corrosion. The apparatus also comprises a magnetizing system arranged outside the passage 1 and adapted to magnetize the ferromagnetic insert 5 in the section 3, when the magnetizing system assumes its extreme position indicated at I, as shown in FIG. 1, or to magnetize the magnetic insert 5 in the section 4, when the magnetizing system assumes another extreme position indicated at II. The magnetizing system 6 is provided with a means for imparting reciprocations thereto between the two extreme positions (viz., I in section 3, and II in section 4) fashioned as two electromagnetic coils 7 disposed at the opposite ends of the passage 1. Parameters of the coils 7, viz., number of coil turns and current strength, are selected so as to ensure the travel of the magnetizing system 6 from one extreme position, such as position I, to the other extreme position, such as position II. In the herein described embodiment of the invention the magnetizing system has the form of a multilayer solenoid, hereinafter referred to as solenoid 6, arranged concentrically with the working passage 1 with a clearance relative to its outer wall. In order to reduce friction and amount of power for moving the solenoid 6, the latter has plain or rolling bearings 8 engageable with guides 9. Each section 3, 4 is provided with an inlet pipe 10,11 to feed the fluid medium being cleaned to the section 3 or 4, and with an oultet pipe 12, 13 for discharging the clean fluid medium.

A modified form of the proposed apparatus according to FIGS. 4, 5, 6, as distinct from the modification shown in FIGS. 1, 2, 3, comprises two identical working passages 1 and 1', each having its own magnetizing system in the form of a multilayer solenoid 6, magnetic cores of the solenoids 6 being rigidly interconnected by connecting strips 14 of magnetic material having low carbon content. The connecting strips 14 provide a closed magnetic circuit to attain, through reducing the losses of magnetic field, the necessary level of magnetization of the insert 5 through its volume, mainly for increasing the level of magnetization of the end areas of the insert 5. In addition, the rigid connecting strip 14 affords synchronous movement of the two solenoids 6. This modification is preferable in the case when it is necessary to clean a fluid medium fed at a substantial flow rate. The diameter of the passages 1 and 1' here can be as large as 0.5-2.0 m, and the length of the ferromagnetic insert can amount to 0.5-1.5 m. With such parameters and in the absence of a closed magnetic circuit losses of magnetic induction can reach 30-60%. The provision of the magnetic strips 14 allows to obviate such a disadvantage.

Referring now to FIGS. 7 and 8, there is shown an alternative modification of an apparatus for separating ferromagnetic materials from fluid media with a vertical arrangement of the working passage 1 and a solenoid 15 with non-uniformly wound coil arranged outside concentrically therewith. The number of coil turns in the solenoid 15 grows from its central portion to the ends with the number of coil turns at the ends of the solenoid 15 thereby exceeding the number of coil turns in its central portion by 20-40%. Each end of solenoid 15 has a recess 16 conforming in shape to the shape of the coil 7, the bottom of each such recess 16 accommodating a resilient spacer 17 fabricated from an elastic material, such as rubber. This modification of the proposed apparatus is also provided with means 18 for locking the magnetizing system (viz., solenoid 15) in its extreme upper and lower positions I and II, respectively.

Each locking means 18 is fashioned as an electromagnet 19 secured at a casing 20 of the apparatus adjacent to one end of the passage 1 so that its core 21 moves in a direction perpendicular to the longitudinal axis of the passage 1, whereas the side surface of the solenoid 15 has sockets 22 equal in number to the number of the electromagnets 19 and adapted to engage with the corresponding spring-loaded core 21. In this modification of the proposed apparatus the guide 9 has a "dove tail" recess. Provided at the ends of the solenoid 15 are projections 23 having a shape corresponding to the shape of the recess of the guide 9 to provide for sliding of the solenoid 15 on the guide 9. The projections 23 have sockets 22 engageable iwth the cores 21 as the locking means 18 are closed.

This modification of the apparatus according to the invention is further provided with a system of pipes for feeding a cooling agent to the solenoid 15. Pipes 24 for feeding and discharging the cooling agent are disposed at the opposite ends of the passage 1 so that their axes are parallel with the longitudinal axis of the passage 1. Each pipe 24 has a flow governor 25, whereas the system of cooling pipes has a means 26 for changing the direction of the flow of the cooling agent. The casing 20 of the apparatus is generally a closed shell of ferromagnetic material. In addition, the ends of the solenoid 15 have plates 27 of ferromagnetic material forming a closed magnetic circuit with the casing 20.

Figure 9:
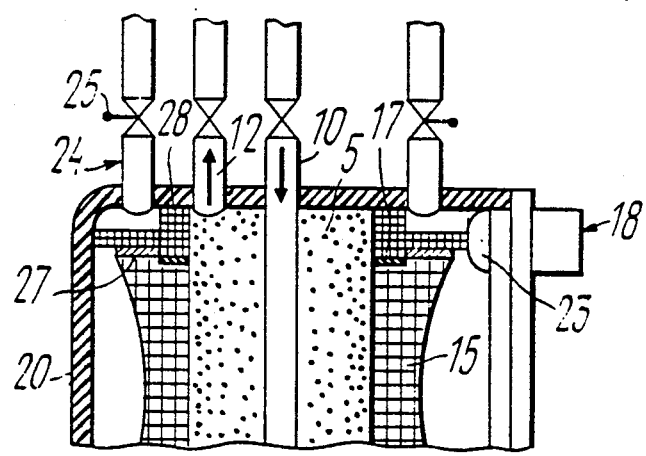
FIG. 9 is a portion A in FIG. 7 with electromagnetic coils of stepped shape.

In a modified form of the proposed apparatus represented in FIG. 9 an electromagnetic coil 28 is stepped, having a height in the central portion substantially greater than at the periphery, whereas its outside diameter is equal to the outside diameter of the solenoid 15 to ensure a greater surface of engagement of the coil 28 with the solenoid 15.

For the sake of clarity sources of power and systems for their connection and disconnection are not shown in the drawings.

The proposed apparatus for separating ferromagnetic materials from fluid media operates as follows.

FIGS. 1,2 and 3 show the proposed apparatus in a position when the section 3 of the apparatus acts to clean the fluid medium from ferromagnetic particles contained therein, whereas the section 4 is under regeneration. Herewith, applied to the vectors of magnetic induction of the solenoids 6 and electromagnetic coil 7 at the section 4, whereby the solenoid 6 is acted upon by a force attracting it toward the coil 7 at the section 4. These forces cause the solenoid 6 to move to the position II on the guides 9 at a high speed. The time during which the solenoid 6 moves from the position I (II) to the position II(I) takes one to several minutes.

Subsequent to the travel of the solenoid 6 to the position II the insert 5 in the section 4 is magnetized and the insert 5 in the section 3 is demagnetized. The section 3 initiates regeneration, pipe 10 delivers the air-water mixture to the section 3, and the fluid medium to be cleaned is now fed along the pipe 11 to the section 4, which now functions in the cleaning mode. Thanks to a very short space of time required for the movement of the magnetizing system from one section to the other, the proposed apparatus operates virtually continuously.

The modification of the proposed apparatus with reference to FIGS. 4, 5 and 6, operates substantially as has been described heretofore, the difference being that the provision of two passages 1 and 1' increases the capacity of the apparatus, while simultaneously reducing the amount of power consumed for its operation.

The provision of the recess 16 at the ends of the solenoid 15 (FIGS. 7 and 8) conforming in shape to the shape of the electromagnetic coil 7 facilitates "reception" of the coil 7 by the recess 16 of the coil of the solenoid 15. This in turn promotes an increase in the power engagement between the coil of the solenoid 15 and electromagnetic coil 7 both during attraction (cleaning mode of operation) and repulsion (regeneration).

Increasing the number of coil turns of the solenoid from its central portion to the ends by 20–40% on the one hand, equalizes magnetization of the end zones of the ferromagnetic insert 5 to the level of magnetization of its central portion, and on the other hand, enhances the power engagement between the coil of the solenoid 6 and electromagnetic coil 7 thereby ensuring fast and reliable movement and locking of the solenoid 15 in the extreme positions I or II. The provision of resilient spacers 17 in the recesses 16 makes it possible to soften the impact accompanying the movement of the solenoid 15 to the electromagnetic coil 7, thereby protecting the solenoid 15 and coils 7 against damage and extending their service life.

As the solenoid 15 assumes one of its extreme positions I or II, the corresponding locking means 18 engages to reliably hold the solenoid 15 in this position. When it is necessary to move the solenoid 15 in the other extreme position, a current is applied to the coil of the electromagnet 19, whereby the core 21 overcomes the force of the spring, is drawn in, leaves the socket 22, and allows the solenoid 15 to freely move on the guide 9.

By virtue of the fact that the pipes 24 of the cooling system are arranged coaxially with the passage 1 of the apparatus, the jets of cooling agent escaping therefrom exert an extra force on the ends of the solenoid 15 thereby enabling a reduction in the amount of power consumed for the movement of the solenoid 15 the coil of the solenoid 6 and to the electromagnetic coil 7 at the end of the passage 1 at the side of the position I are currents of such polarity that the vectors of their magnetic induction are directed to one side. The solenoid 6 is thereby attracted to the coil 7. The ferromagnetic insert in the section 3 is magnetized. A contaminated fluid medium is admitted through the pipe 13 to the section 3 to flow through the magnetized filtering insert 5, to be cleaned from ferromagnetic and non-ferromagnetic particles present therein, and to be evacuated from the section 3 via the pipe 12.

At this point in time the section 4 of the apparatus is under regeneration. The electromagnetic coil 7 at the side of the section 4 (position II) is deenergized, and the ferromagnetic insert 5 in this section is demagnetized. An air-water mixture is supplied along the pipe 11 to the section 4 at a flow rate ensuring washing the granules of the insert 5 of the contaminants to a desired degree. The contaminated washing mixture is thereafter evacuated along the pipe 13.

After the insert 5 in the section 3 has been fouled with contaminants, the magnetizing system (solenoid 6) is moved from the position I to the position II. For this purpose the polarity of current applied to the coil 7 at the section 3 is changed, whereby the vectors of magnetic induction of this coil 7 and solenoid 6 are caused to be directed to the opposite sides, and the solenoid 6 is acted upon by a force directed from the coil 7 at the section 3. Concurrently, applied to the coil 7 at the section 4 is a current of a polarity ensuring consistent direction of from one extreme position I to the other position II. By varying the flow rate of the cooling agent by the flow governor 25 a pressure head is produced facilitating the movement of the magnetizing system and simultaneously preventing overheat of the electromagnetic coils 7 and solenoid 15. The ferromagnetic plates 27 here function as a movable "piston" engageable with the pressure jets of the cooling agent during movement of the solenoid 15. The provision of the cooling system with pipes 24 arranged coaxially with the passage 1, provided with the flow governor 25 and means 26 for changing the direction of feeding the cooling agent is especially advantageous with the vertical arrangement of the magnetizing system and working passage 1, where the movement of the magnetizing system upwards necessitates an attractive force equal in magnitude to or exceeding the weight of the magnetizing system, whereas the movement downwards necessitates a counteracting force to smooth the movement of the magnetizing system to the extreme bottom position.

With reference to FIG. 9, the modified form of the apparatus operates substantially similarly to the one shown in FIGS. 7 and 8, the difference being in that the stepped configuration of the electromagnetic coil 28 apart from ensuring the movement of the solenoid 15, magnetizes the end areas of the ferromagnetic insert 5. In the cleaning operation mode the coil 28 is energized so that the vectors of magnetic induction of the coil 28 and solenoid 15 (magnetizing system) are directed similarly, whereby this shape of the coil 28 enhances magnetization of the end zones of the ferromagnetic insert 5 to facilitate a more uniform magnetization of the insert 5.

The invention can find application in metallurgy, chemistry, heat power engineering, as well as in electric power, machine-building, gas-cleaning, biological and other industries predominantly for fine cleaning circulating water, oils, condensates, ammonia liquor, ammonia, alkali, electroplating effluents, steam, gas and other fluid media from products of corrosion and wear of equipment and machine parts, dispersed scale, and the like.

We claim:

1. An apparatus for separating ferromagnetic materials from fluid media, comprising: at least one stationary working passage divided by a hermetic partition into two successive sections each containing an insert of ferromagnetic material, having an inlet pipe for feeding a fluid medium to be cleaned to a respective section and an outlet pipe for discharging a clean fluid medium, and a magnetizing system arranged outside the passage for magnetizing the ferromagnetic insert of one section and provided with a means for imparting reciprocations to the ferromagnetic insert along the passage between two extreme positions, corresponding to each successive section, the means for imparting reciprocations comprising at least two electromagnetic coils arranged at opposite ends of the passage, so that the coils ensure movement of the magnetizing system between the extreme positions.

2. An apparatus as claimed in claim 1, in which the magnetizing system comprises a solenoid disposed concentrically with the working passage, each end of the solenoid having a recess conforming in shape to a shape of a corresponding electromagnetic coil.

3. An apparatus as claimed in claim 2, wherein a bottom of the recess accommodates a resilient spacer.

4. An apparatus as claimed in claim 2, further comprising: means for locking the magnetizing system in the extreme positions, each such locking means comprising an electromagnet secured at one end of the passage so that a core of the electromagnet moves perpendicularly to an axis of the passage, whereas a side surface of the solenoid has sockets equal in number to a number of the electromagnets and adapted to engage the corresponding core.

5. An apparatus as claimed in claim 2, wherein the solenoid has a non-uniform winding with a number of coil turns growing from a central portion of the solenoid to ends of the solenoid.

6. An apparatus as claimed in claim 5, wherein the number of coil turns at the ends exceeds the number of coil turns in the central portion by 20–40%.

7. An apparatus as claimed in claim 1, further comprising means for cooling the magnetizing system having pipes for feeding and discharging a cooling agent, these pipes being arranged at opposite ends of the passage, so that axes of the pipes are parallel with an axis of the passage each pipe being provided with a flow governor and means for reversing feed of cooling agent.

* * * * *